Patented Apr. 30, 1946 2,399,595

UNITED STATES PATENT OFFICE 2,399,595

PROCESS FOR MANUFACTURING ACYLOXY CARBOXYLIC ACIDS

Edward M. Filachione, Philadelphia, and Charles H. Fisher, Abington, Pa., assignors to the United States of America, as represented by the Secretary of Agriculture No Drawing. Application May 4, 1943, Serial No. 485,619

7 Claims. (Cl. 260—478)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to the production of acyloxy carboxylic acids.

It is known that hydroxy carboxylic acids can be converted into acyloxy carboxylic acids by treatment with relatively expensive acylating agents such as acid halides (Fischer, Ber. 47, 768; Patterson and Forsyth, J. Chem. Soc. 103, 2263 (1913) acid anhydrides (Burns, Jones and Ritchie, J. Chem. Soc. 1935, 400, 1054; Ritchie, Jones, and Burns, U. S. 2,265,814, Dec. 9, 1941; Smith, Fisher, Ratchford, Ind. Eng. Chem. 34, 473 (1942), and ketene (Claborn and Smith, J. Am. Chem. Soc. 61, 2727 (1939)).

An object of our invention is to provide a more efficient method of manufacturing acyloxy carboxylic acids.

A further object is to provide a method whereby acyloxy carboxylic acids can be produced readily, conveniently, and at low cost from hydroxy carboxylic acids and carboxylic acids.

A further object is to acylate hydroxy carboxylic acids in such a manner that water, a neutral material, is obtained as a by-product instead of corrosive acids such as hydrogen chloride and acetic acid.

We have found that carboxylic acids can be substituted for the more expensive acid halides, acid anhydrides, and ketene, previously used as acylating agents, and that hydroxy carboxylic acids can be acylated readily, conveniently, inexpensively and in good yields with carboxylic acids.

The reaction can be carried out favorably by heating one part of hydroxy carboxylic acid with one or more parts of carboxylic acid in the presence of a catalyst, such as sulfuric acid, toluenesulfonic acid, phosphoric acid, sodium hydrogen sulfate or zinc chloride, and an entraining agent, such as benzene, toluene, ligroin, or ethylene dichloride. During the reaction, water and the entraining agent are distilled, the vapors are condensed, water and the entraining agent are separated in a suitable trap, and the entraining agent is returned to the reaction chamber. After one mole of water has been removed for each mole of hydroxy carboxylic acid used (in addition to any water present in the reagents as an impurity), the acid catalyst is neutralized, and the mixture is distilled. After the forerun containing any unreacted acylating agent distils, a fraction containing acyloxy carboxylic acid is obtained in good yield:

$$RCOOH + HO[C(R)_2]_xCOOH \rightarrow$$
$$RCOO[C(R)_2]_xCOOH + H_2O$$

where R is hydrogen or an alkyl group, and $x$ is a positive integer.

We have also found that yields are increased and that the preparation of acyloxy carboxylic acids is facilitated if a carboxylic acid is included when hydroxy carboxylic acids are acylated with acid chlorides, acid anhydrides and ketene.

Our improved methods of preparing acyloxy carboxylic acids are well suited for making alpha-acetoxypropionic acid by the interaction of lactic acid and acetic acid. Alpha-acetoxypropionic acid is distillable and is converted into lactic acid and acetic acid on hydrolysis with water. Hence, lactic acid can be advantageously purified by acetylation with acetic acid, purification of the alpha-acetoxypropionic acid thus formed by distillation, hydrolysis of the purified alpha-acetoxypropionic acid, and finally, removal of acetic acid and water from the hydrolysis mixture leaving a residue of concentrated lactic acid of high purity. Also, alpha-acetoxypropionic acid is converted into alpha-acetoxypropionic acetic anhydride and alpha-acetoxypropionic anhydride by treatment with acetic anhydride or ketene. Alpha-acetoxypropionic anhydride is a useful reagent for converting alcohols and phenols into esters of alpha-acetoxypropionic acid, and esters of alpha-acetoxypropionic acid are of value because they yield acrylic esters, resin and synthetic rubber intermediates, when pyrolyzed (Smith, Fisher, Ratchford and Fein, Ind. Eng. Chem. 34, 473 (1942)).

The following examples illustrate our invention:

Example I

To 150 g. of commercial 100 percent lactic acid, 0.4 cc. of concentrated sulfuric acid was added, with stirring and cooling, and then 168 g. (10 percent excess) of acetic anhydride was added. After standing overnight the mixture was refluxed for one hour. One gram of fused sodium acetate was then added to neutralize the sulfuric acid. Acetic acid was removed by vacuum distillation (water pump), and the residue was distilled at about 0.06 mm. Ninety-three grams (50 percent yield) of alpha-acetoxypropionic acid boiling at 85°–97° C. under 0.07 mm. of mercury pressure was obtained. The product had a refractive index of 1.4237 at 20° C.

To 100 g. of lactic acid, 500 g. of 4.2 percent solution of hydrogen chloride in glacial acetic acid was added, and then 112 g. of acetic anhydride was gradually added. After standing 0.5 hour, the mixture was heated on the steam bath for 4 to 8 hours. The reaction mixture was distilled at atmospheric pressure until 380 cc. of distillate collected, and then distillation was continued in vacuo. The yield of alpha-acetoxypropionic acid, boiling at 90°–100° C. under 0.03 mm. of mercury pressure, was 93.5 g. (71 percent yield).

*Example II*

To 100 g. of lactic acid, 1000 g. of a 4.2 percent solution of hydrogen chloride in glacial acetic acid was added, followed by the addition of 112 g. of acetic anhydride. The reaction mixture was heated on the steam bath for 4 to 8 hours. After standing 6 days, the reaction mixture was distilled at atmospheric pressure until 770 g. of distillate collected, and then distillation was continued under vacuum. There resulted 110 g. (78.5 percent yield) of alpha-acetoxypropionic acid, B. P. 85°–100° C. under approximately 0.03 mm. of mercury pressure.

*Example III*

To 100 g. of lactic acid, 500 cc. of glacial acetic acid was added, and then, with stirring, 85 g. of acetyl chloride was added. The mixture, after standing overnight, was heated for 2 hours on the steam bath. Acetic acid was first removed by distillation at atmospheric pressure until 400 cc. of distillate collected. Alpha-acetoxypropionic acid was collected at 90°–100° C. under 0.1 to 0.2 mm. pressure, and amounted to 69 g.

In a similar acetylation with acetyl chloride where acetic acid was not used, 54 g. of alpha-acetoxypropionic acid was obtained as compared to 69 g. resulting in the above procedure.

*Example IV*

A mixture of 92 g. of 100 percent lactic acid, 500 cc. of glacial acetic acid, 150 cc. of benzene and 1 cc. of concentrated sulfuric acid, was refluxed for 5.5 hours in an apparatus designed for the continuous automatic removal of water from the esterification mixture. The sulfuric acid catalyst was then neutralized with fused sodium acetate and the mixture distilled. There resulted 72 g. (55 percent yield) of alpha-acetoxypropionic acid.

*Example V*

An experiment similar to that in Example IV except that an equivalent amount of 80 percent aqueous lactic acid was used gave a 70 percent yield of alpha-acetoxypropionic acid.

*Example VI*

A mixture consisting of 112 g. of 80 percent lactic acid (containing 1 mole of available lactic acid), 1000 g. of glacial acetic acid, 200 ml. of benzene, and 1 ml. of concentrated sulfuric acid, was refluxed for 6 hours with continuous removal of water. After neutralization with sodium acetate, a 78 percent yield of acetoxypropionic acid was obtained on distillation.

We are not limited to the particular materials or procedures disclosed in the examples set forth above. It will be apparent to those skilled in the art that various modifications of procedure may be employed without departing from the scope of our invention. For example, various carboxylic acids may be used instead of acetic acid, and various hydroxy carboxylic acids may be substituted for lactic acid. The catalyst may be omitted, although we prefer to use one. Diluents may be used if desired. Instead of returning the entraining agent to the reaction mixture during the reaction, both water and entraining agent may be removed. Additional entraining agent may be added during the reaction. Pressures other than atmospheric may be used.

Having thus described our invention, we claim:

1. The process of manufacturing alpha-acetoxypropionic acid which comprises heating a mixture of lactic acid and an excess of acetic acid in the presence of a catalyst, whereby the acids in said mixture are reacted to form alpha-acetoxypropionic acid, removing the water formed during the reaction with an entraining agent, neutralizing the catalyst, and then recovering the alpha-acetoxypropionic acid.

2. The process defined in claim 1, in which the catalyst is sulfuric acid.

3. The process defined in claim 1, in which the entraining agent is benzene.

4. The process of manufacturing alpha-acetoxypropionic acid which comprises heating a mixture of lactic acid, an acetylating agent selected from the group consisting of an acetyl halide and acetic anhydride and an excess of acetic acid in the presence of a catalyst, whereby alpha-acetoxypropionic acid is formed, neutralizing the catalyst, and then recovering the alpha-acetoxypropionic acid.

5. The process defined in claim 4, in which the catalyst is sulfuric acid.

6. The process defined in claim 4, in which the catalyst is hydrogen chloride.

7. The process of manufacturing alpha-acetoxypropionic acid which comprises heating a mixture of substantially pure lactic acid and an excess of glacial acetic acid in the presence of an acid catalyst, whereby the acids in said mixture are reacted to form alpha-acetoxypropionic acid, continuously removing the water formed during the reaction with an entraining agent, neutralizing the catalyst, and then recovering the alpha-acetoxypropionic acid.

EDWARD M. FILACHIONE.
CHARLES H. FISHER.